(12) United States Patent
Burgett et al.

(10) Patent No.: US 9,702,472 B2
(45) Date of Patent: Jul. 11, 2017

(54) CENTER FLOW PRESSURE RELIEF VALVE

(71) Applicant: TESCOM CORPORATION, Elk River, MN (US)

(72) Inventors: Eric Burgett, McKinney, TX (US); Sun Junyi, Shanghai (CN)

(73) Assignee: TESCOM CORPORATION, Elk River, MN (US)

( * ) Notice: Subject to any disclaimer, the term of this patent is extended or adjusted under 35 U.S.C. 154(b) by 0 days.

(21) Appl. No.: 14/693,374

(22) Filed: Apr. 22, 2015

(65) Prior Publication Data

US 2016/0273669 A1  Sep. 22, 2016

(30) Foreign Application Priority Data

Mar. 16, 2015 (CN) .................. 2015 1 01150890

(51) Int. Cl.
| | |
|---|---|
| *F16K 15/02* | (2006.01) |
| *F16K 17/06* | (2006.01) |
| *F16K 24/04* | (2006.01) |

(52) U.S. Cl.
CPC .............. *F16K 17/06* (2013.01); *F16K 24/04* (2013.01)

(58) Field of Classification Search
CPC ......... F16K 17/06; F16K 24/04; F16K 15/063
USPC ....................................................... 137/540
See application file for complete search history.

(56) References Cited

U.S. PATENT DOCUMENTS

| | | | | |
|---|---|---|---|---|
| 2,670,922 A | * | 3/1954 | Carlisle ................. | F16K 15/026 137/540 |
| 3,025,874 A | * | 3/1962 | Yocum ...................... | F16K 1/36 137/540 |
| 3,149,643 A | | 9/1964 | Breitsprecher | |
| 3,770,009 A | * | 11/1973 | Miller ................... | F16K 15/026 137/515.5 |
| 2005/0016597 A1 | | 1/2005 | Hope et al. | |

FOREIGN PATENT DOCUMENTS

| | | |
|---|---|---|
| EP | 2282089 A1 | 2/2011 |
| EP | 2728161 A1 | 5/2014 |

OTHER PUBLICATIONS

Search Report for International application No. PCT/US2016/021316, mailed Jun. 23, 2016.
Written Opinion for International application No. PCT/US2016/021316, mailed Jun. 23, 2016.

* cited by examiner

*Primary Examiner* — Kevin Lee
*Assistant Examiner* — P. Macade Nichols
(74) *Attorney, Agent, or Firm* — Marshall, Gerstein & Borun LLP

(57) ABSTRACT

A pressure relief valve includes a one-piece combined plug that includes a seat at one end, a spring guide at another end, and a plug between the seat and the spring guide. A central bore extends through the spring guide and the plug and a branch channel extends outward from one end of the central bore.

15 Claims, 1 Drawing Sheet

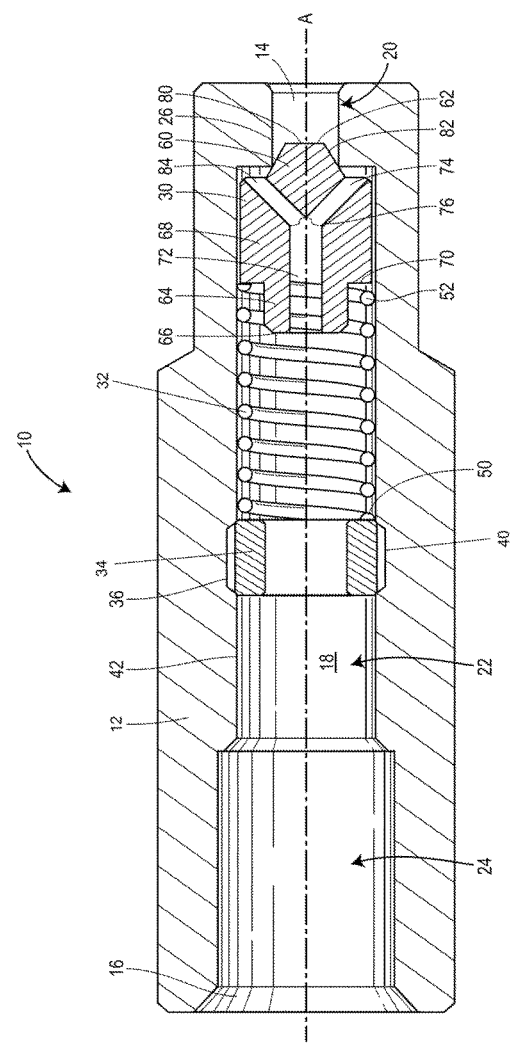

CENTER FLOW PRESSURE RELIEF VALVE

FIELD OF THE DISCLOSURE

This disclosure relates generally to valves and, more specifically, to pressure relief valves.

BACKGROUND

Pressure relief valves are used in a variety of commercial, industrial and domestic applications to maintain a pressure within a container below a predetermined maximum pressure. Specifically, if the pressure within the container exceeds a start-to-discharge pressure or predetermined maximum pressure, the pressure relief valve will open to vent fluid to the atmosphere until the pressure within the container decreases below the predetermined maximum pressure. The amount and rate at which the fluid or vapor is vented to the atmosphere is associated with the magnitude of the pressure within the container.

Different pressure relief valves have different sizes, start-to-discharge pressures and flow capacities. A pressure relief valve may be selected for use with a container based on a design specification of the container such as a maximum pressure to which the container can be safely exposed without rupturing.

Known pressure relief valves often include a spring that exerts a force on a shaft to urge a valve plug towards a valve seat or seating surface. The spring is seated within a spring guide that maintains the spring in the proper position within the valve body. An adjusting nut may be threaded onto the stem, within the valve body, the adjusting nut being used to vary the amount of force exerted by the spring on the stem. A locking nut is threaded onto the stem behind the adjusting nut to prevent the adjusting nut from being loosened during use. Known pressure relief valves are generally expensive and time consuming to assemble due to the large number of internal parts.

SUMMARY

In one aspect, a pressure relief valve comprises a valve body having a fluid inlet and a fluid outlet connected by a fluid passageway. A one-piece combined plug is disposed within the fluid passageway. The one-piece combined plug includes a central bore that allows fluid to flow through the one-piece combined plug.

In further accordance with any one or more of the foregoing first and second aspects, a pressure relief valve as outlined above may further include any one or more of the following preferred forms.

In one preferred form, the valve body includes a first portion having a first diameter, a second portion having a second diameter, and a third portion having a third diameter, the third diameter being larger than the first diameter and the second diameter and the second diameter being larger than the first diameter.

In other preferred forms, the combined plug includes a seat at a first end, a spring guide at a second end, and a plug between the seat and the spring guide.

In yet other preferred forms, the seat includes a front surface that is distal to the plug, the front surface having a diameter that is less than the first diameter. The seat may include an angled side surface that is non-parallel and non-perpendicular to a longitudinal axis of the valve body. In some preferred forms, the angled side surface may be angled in the range of 60-85 degrees, preferably in the range of 60-80 degrees, relative to the longitudinal axis of the valve body.

In yet other preferred forms, the spring guide may have an outer diameter that is less than an outer diameter of the plug. A junction of the spring guide and the plug may form a spring seating shoulder.

In yet other preferred forms, the central bore may extend through the plug and the spring guide and a branch channel may extend outward from a first end of the central bore.

Other preferred forms may include a plurality of branch channels. The plurality of branch channels, in some preferred embodiments, may form a single continuous annular space.

In yet other preferred embodiments, the branch channel may be angled, non-parallel and non-perpendicular, to a longitudinal axis of the valve body. In some embodiments, branch channel may be angled in the range of 20-80 degrees, preferably in the range of 30-70 degrees, and more preferably in the range of 30-60 degrees relative to the longitudinal axis of the valve body.

In yet other preferred embodiments, a spring may be disposed in the fluid passageway, the spring biasing the combined plug towards a seating surface in the valve body. In some embodiments, the spring may have an outer diameter that is substantially equal to an inner diameter of the valve body.

In yet other preferred embodiments, the spring may be guided by the inner surface of the valve body.

In yet other preferred embodiments, a retaining nut may be disposed within the fluid passageway, the spring being disposed between the retaining nut and the combined plug.

In yet other preferred embodiments, the retaining nut may include external threads that cooperate with internal threads in the valve body to releasably secure the retaining nut in the valve body.

BRIEF DESCRIPTION OF THE DRAWINGS

The FIGURE illustrates one example of a center flow pressure relief valve constructed in accordance with the teachings of the disclosure.

DETAILED DESCRIPTION

Certain examples are shown in the above-identified FIGURE and described in detail below. The FIGURE is not necessarily illustrated to scale and certain features and certain views of the FIGURE may be shown exaggerated in scale or in schematic for clarity and/or conciseness. Additionally, while certain variations have been described throughout this specification, any feature from any variation may be included with, a replacement for, or otherwise combined with other variations to form other examples.

The example pressure relief valve described herein advantageously includes fewer internal parts than known pressure relief valves, which reduces material cost and manufacturing time. Furthermore, the example pressure relief valve described herein includes a one-piece seat, stem, and guide that allows fluid to flow around the seat, but through the center of the stem and spring so that flow is not impaired by movement of the stem or spring.

The FIGURE illustrates a center flow pressure relief valve 10 that includes a body 12, a fluid inlet 14, and a fluid outlet 16, the fluid inlet 14 and the fluid outlet 16 being fluidly connected by a central fluid passageway 18. The central fluid passageway 18 may include a first portion 20 having a first diameter, a second portion 22 having a second diameter, and a third portion 24 having a third diameter, the third diameter being larger than the first and second diameters and the second diameter being larger than the first diameter. The intersection of the first portion 20 and the second portion 22 may form a seating surface 26. In other embodiments, the valve body 12 may include only a first portion and a second portion, the intersection of the first portion and the second portion forming the seating surface.

A combined stem, guide, and seat, hereinafter referred to as a combined plug 30 is slidably movable within the second portion 22 along a longitudinal axis A of the valve body 12. A biasing element, such as a spring 32 is located between the combined plug 30 and a retaining nut 34, the retaining nut 34 having external threads 36 that threadedly engage internal threads 40 on an inner surface 42 of the second portion 22.

The spring 32 seats against the retaining nut 34 at a first end 50 and against the combined plug 30 at a second end 52. The spring 32 is guided laterally by the inner surface 42 of the second portion 22.

The combined plug 30 includes a seat 60 at a first end 62, a spring guide 64 at a second end 66, and a plug 68 between the seat 60 and the spring guide 64. The spring guide 64 extends longitudinally outward, away from the plug 68. The spring guide 64 has an outer diameter that is smaller than the outer diameter of the plug 68, thereby forming a seating shoulder 70 for the spring 32.

A central bore 72 extends through the plug 68 and through the spring guide 64. A plurality of branch channels 74 extend outward from a first end 76 of the central bore 72. The branch channels 74 may be a plurality of channels or bores. In other embodiments, the branch channels 74 may be formed from a single continuous annular space.

The branch channels 74 are angled laterally outward, away from the longitudinal axis A. The branch channels 74 are non-parallel and non-perpendicular to the longitudinal axis A. Preferably the branch channels 74 are angled between 20 degrees and 80 degrees relative to the longitudinal axis A, more preferably between 30 degrees and 70 degrees, and even more preferably between 30 degrees and 60 degrees. In one embodiment, the branch channels 74 are angled at 45 degrees relative to the longitudinal axis A. Angles in these ranges produce a radially and longitudinally compact combined plug 30, thereby reducing the overall radial and longitudinal dimensions of the relief valve 10.

The branch channels 74 separate the plug 68 from the seat 60. The seat 60 may include a front surface 80 distal to the plug. The front surface 80 may have a lateral dimension that is smaller than the first diameter of the first portion 20. The seat 60 may have an angled side surface 82. The angled side surface 82 being non-parallel and non-perpendicular relative to the front surface 80. The angled side surface 82 may be angled between 60 and 85 degrees, preferably between 60 and 80 degrees relative to the front surface 80. Angles in these ranges produce a radially and longitudinally compact seat 60, thereby reducing the overall radial and longitudinal dimensions of the relief valve 10. The angled side surface 82 extends from a terminus 84 of the branch channels 74 to the front surface 80.

In use, initially fluid pressure at the fluid inlet 14 is overcome or balanced by the biasing force of the spring 32. The front surface 80 of the plug 60 is located within the first portion 20 and the angled side surface 82 contacts the seating surface 26, thereby preventing fluid flow through the valve 10. As fluid pressure at the fluid inlet 14 increases, eventually the fluid pressure at the fluid inlet 14 will overcome the biasing force of the spring 32 and the combined plug 30 will begin to move away from the seating surface 26, which will allow fluid to begin flowing around the seat 60 and into the branch channels 74, through the central bore 72, through the spring 32, through the retaining nut 34 and through the fluid exit 16. As the volume of fluid flowing through the valve increases, fluid pressure at the fluid inlet 14 will begin to decrease (assuming the pressure relief valve is connected to a closed system, such as a storage tank). Fluid will flow through the relief valve 10 until the fluid pressure at the fluid inlet 14 drops to the point at which it is overcome by the biasing force of the spring 32 and the combined plug 30 moves towards the seating surface 26 until the angled side surface 82 contacts the seating surface 26 to again prevent fluid flow through the relief valve 10.

The biasing force produced by the spring 32 may be adjusted by moving the retaining nut 34 longitudinally within the valve body 12. For example, moving the retaining nut 34 towards the inlet 14 increases the biasing force by compressing the spring 32 and moving the retaining nut 34 away from the inlet 14 reduces the biasing force by relaxing the spring 32.

The disclosed relief valve advantageously includes fewer parts than prior art relief valves while being more compact both radially and longitudinally relative to prior art relief valves. By forming the stem, guide, and seat as a singled combined plug, the combined plug may be more easily manufactured, for example by injection molding or machine cut from bar stock. Furthermore, the combined plug makes assembly of the relief valve more efficient. The combined plug may be made from metal, such as aluminum, elastomeric materials, or plastics, such as Teflon® or PTFE. In other embodiments, the spring and the retaining nut may be manufactured as a single piece to further reduce manufacturing costs and assembly time.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A pressure relief valve, comprising:
   a valve body having a fluid inlet and a fluid outlet connected by a fluid passageway; and
   a one-piece combined plug disposed within the fluid passageway, the one-piece combined plug including a central bore that allows fluid to flow through the one-piece combined plug; and
   a branch channel extending outward from one end of the central bore, the branch channel being angled, non-parallel and non-perpendicular, relative to a longitudinal axis of the combined plug,
   wherein the combined plug includes a seat at a first end, a spring guide at a second end, and a plug between the seat and the spring guide, the seat including a front surface that is distal to the plug, and the seat further including an angled side surface that is non-parallel and non-perpendicular to a longitudinal axis of the valve body, the angled side surface extending from a terminus of the branch channel to the front surface.

2. The pressure relief valve of claim 1, wherein the valve body includes a first portion having a first diameter, a second portion having a second diameter, and a third portion having a third diameter, the third diameter being larger than the first diameter and the second diameter and the second diameter being larger than the first diameter.

3. The pressure relief valve of claim 1, wherein the angled side surface is angled in a range of 60-80 degrees relative to the longitudinal axis of the valve body.

4. The pressure relief valve of claim 1, wherein the spring guide has an outer diameter that is less than an outer diameter of the plug.

5. The pressure relief valve of claim 4, wherein a junction of the spring guide and the plug forms a spring seating shoulder.

6. The pressure relief valve of claim 1, wherein the central bore extends through the plug and the spring guide.

7. The pressure relief valve of claim 1, further comprising a plurality of branch channels.

8. The pressure relief valve of claim 7, wherein the plurality of branch channels forms a single continuous annular space that is separate from, but connected to, the central bore.

9. The pressure relief valve of claim 1, wherein the branch channel is angled in a range of 30-70 degrees relative to the longitudinal axis of the valve body.

10. The pressure relief valve of claim 1, further comprising a spring disposed in the fluid passageway, the spring biasing the combined plug towards a seating surface in the valve body.

11. The pressure relief valve of claim 10, wherein the spring has an outer diameter that is substantially equal to an inner diameter of the valve body.

12. The pressure relief valve of claim 11, wherein the spring is guided by an inner surface of the valve body.

13. The pressure relief valve of claim 10, further comprising a retaining nut disposed within the fluid passageway, the spring being disposed between the retaining nut and the combined plug.

14. The pressure relief valve of claim 13, wherein the retaining nut includes external threads that cooperate with internal threads in the valve body to releasably secure the retaining nut in the valve body.

15. A one-piece combined plug for a pressure relief valve, the combined plug comprising:
   a seat at a first end;
   a spring guide at a second end;
   a plug between the seat and the spring guide;
   a central bore extending through the plug and the spring guide; and
   a branch channel extending outward from one end of the central bore, the branch channel being angled, non-parallel and non-perpendicular, relative to a longitudinal axis of the combined plug;
   wherein the seat includes a front surface that is distal to the plug, and the seat further includes an angled side surface that is non-parallel and non-perpendicular to a longitudinal axis of the valve body, the angled side surface extending from a terminus of the branch channel to the front surface.

* * * * *